March 5, 1935.   G. WOLFF   1,993,080
WHEEL SUSPENSION
Filed April 18, 1934
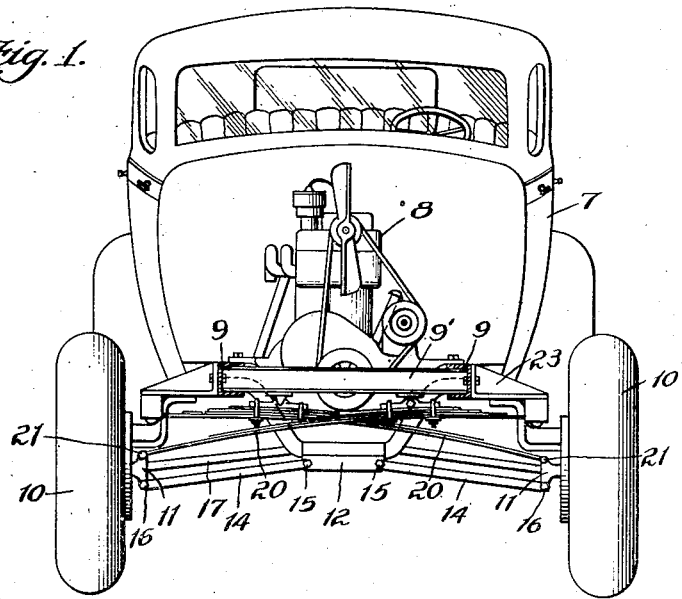
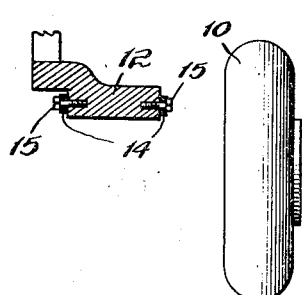
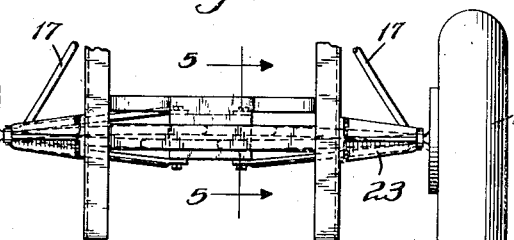
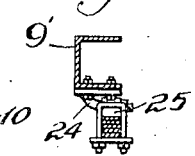
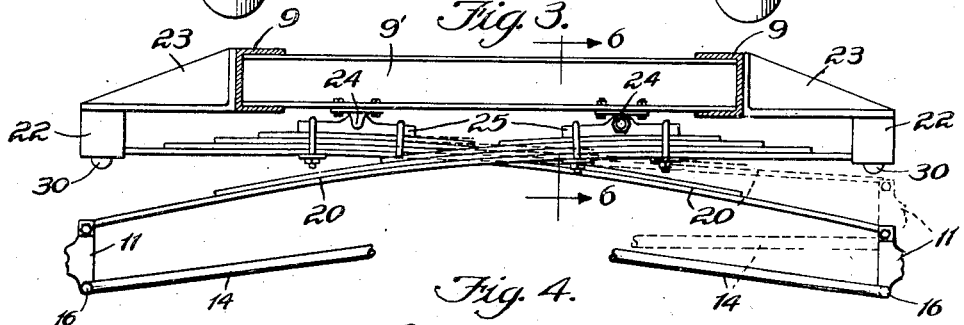
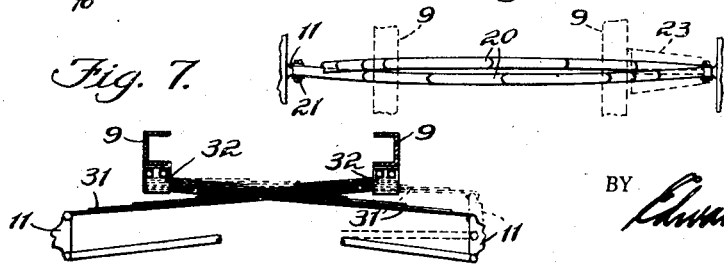
INVENTOR.
George Wolff
BY
ATTORNEY.

Patented Mar. 5, 1935

1,993,080

UNITED STATES PATENT OFFICE 1,993,080

WHEEL SUSPENSION

George Wolff, Wheaton, Ill.

Application April 18, 1934, Serial No. 721,071

3 Claims. (Cl. 267—19)

My invention relates to an improved wheel suspension for automotive vehicles and more particularly to that type of suspension for the wheels of an automotive vehicle which is known as independent wheel suspension or individual springing.

It has been found desirable to spring mount the wheels of an automotive vehicle in relation to the frame in a manner whereby each wheel may move relative to the frame independently of the opposite wheel. Such mountings are now examples of the best commercial practice, particularly in suspending or springing the front wheels of the vehicle. The results sought in the use of such design are the elimination of road shock and prevention of the transmission of torsional vibrations and stresses to the frame.

Heretofore in the art such wheel suspension and spring mounting has been accomplished by the utilization of coil springs and elaborate housing assemblies therefor, and each wheel spring has been mounted on the side of the frame adjacent the particular wheel it supports.

It is an object of my invention to provide an improved wheel suspension for an automotive vehicle.

Another object is to provide an independent front wheel suspension system for an automotive vehicle which employs leaf springs.

A further object of my invention is to provide an independent front wheel suspension system for an automotive vehicle wherein each wheel is associated with the frame through a separate transverse cantilever leaf spring.

A further object of my invention is to provide in an independent front wheel suspension system wherein separate transverse leaf springs are employed for each wheel, an improved method of mounting said springs.

A further object of my invention is to fix the separate spring for each wheel to the side of the vehicle frame opposite the side on which the particular wheel it supports is disposed.

A still further object is to provide a separate transversely extending cantilever spring for each front wheel, so mounted that the pivot bearing or trunnion of the spring is located on the opposite side of the center line of the vehicle frame to that on which the wheel it supports is located.

A still further object is to provide an improved independent wheel suspension wheel system for an automotive vehicle which is novel, efficient and economical to manufacture.

Many other objects and advantages will readily become apparent throughout a reading of the following detailed description and accompanying drawing in which, Figure 1 is a front view of an automotive vehicle shown with the radiator, hood and front fenders removed illustrating an application of the preferred form of the independent wheel suspension system of my invention, Figure 2 is a fragmentary plan view of the front wheel portion of the automotive vehicle illustrated in Figure 1, illustrating the spring suspension of my invention, Figure 3 is an enlarged front detail view of the transverse wheel springing system of my invention of the preferred form employing cantilever type springs, Figure 4 is a diagrammatic plan view of the spring mounting of one form of my invention illustrating the manner in which the ends of the springs are disposed relative to each other, Figure 5 is an enlarged detail view taken on the line 5—5 of Figure 2, looking in the direction indicated by the arrows, and Figure 6 is an enlarged detail view taken on the line 6—6 of Figure 3, looking in the direction indicated by the arrows, Figure 7 is a diagrammatic front view of a modified form of spring mounting of my invention.

Referring now to the drawing in detail in which like reference characters designate like parts throughout the several views, I have illustrated in Figure 1 an automotive vehicle 7 having an engine 8, frame side-rails 9, and front wheels 10. The numeral 11 indicates the front wheel spindle king-pin member. A yoke-shaped cross member 12 is fixed at each of its ends to the frame side-rails 9. A pair of radius rods 14 are pivotally mounted at their inner ends to the cross member 12 at 15 (see Figs. 2 and 5). The outer ends of said rods are pivotally secured at 16 to the spindle members 11. The rods 14 act to retain the wheel centers and permit vertical movements of the wheels. A pair of radius rods 17 are connected to the wheel spindle members 11 and are preferably mounted for universal movements at their opposite ends (not shown).

In the preferred form of my invention illustrated in Figures 1, 2, 3 and 4, I provide a separate, cantilever, transversely extending leaf spring 20 for each wheel. One end of the spring is pivotally secured to the wheel spindle member 11 at 21 in a well-known manner. The opposite end of the spring 20 is fixedly mounted in a suitable shackle 22, a rubber mounted type of retainer being illustrated in the drawing. The shackle 22 is fixed to the outer end of the bracket 23 which is mounted on the side rail 9 of the frame of the vehicle opposite to the side on which the particular wheel it suspends is located. It will be noted that the provision of the bracket 23 permits the location of the outer shackled end of each spring at any desired point beyond the side rail of the frame and limited only by the location of the wheel. The spring carries a conventional saddle member 25 which is pivotally mounted on a bearing arm 24, said arm being fixed to the under side of a cross member 9' of the frame 9 to provide a cantilever spring suspension.

It will be noted that the transverse spring 20 for the right wheel 10 is mounted on the left side of the center line of the vehicle frame and the left wheel spring is mounted on the right side of the frame. This novel arrangement of my invention provides the desired length for the transverse spring, permits the use of a cantilever spring and insures the individual action for the wheel which is desired. The raising of the right wheel cannot transmit any wracking motion to the right side of the frame and the same is true of the action of the left wheel with respect to the left side of the frame.

I contemplate altering the location of the point at which the center trunnion bearing of each transverse spring is secured to the frame in accordance with the length of spring desired and also the location of the end shackle member 22, but the principle of having a substantially transverse cantilever spring for each respective wheel which is fixed to the vehicle frame on the side of the center line of the vehicle opposite to the wheel it supports, is to be retained. This feature not only assures that the action of each wheel shall be entirely independent of the other but that the frame of the vehicle will not be subjected to torsional twisting as each wheel reciprocates in its vertical path. The tendency of the wheel which is being raised, to raise the side of the frame adjacent the wheel, is eliminated by the arrangement of my invention and it is counteracted by the position of the opposite side of the frame. In tests of the device of my invention it has been found that the front end of the automotive vehicle will remain in perfect horizontal alignment regardless of the degree of independent vertical movement, upwardly or downwardly, of the front wheel with the consequent flexing of the transverse springs.

Referring now to Figures 2 and 4, it will be noted that I contemplate, wherever desirable, to locate the end of the spring which is shackled to the bracket 23 directly above and in the vertical plane of the opposite end of the spring for the opposite wheel. This is best illustrated in Figures 2, 3 and 4, and can be accomplished by employing a curved spring having a slight radius when viewed from above as in Figure 4. I may thus provide a rubber bumper 30, (see Fig. 3), on the under side of each member 22 to act as a stop for limiting excessive vertical movement of the spring.

It is understood that this arrangement of the springs of my invention is not the only arrangement possible and the springs may be in different vertical planes and still accomplish the objects of my invention.

I have illustrated in Figure 7 a modified form of my invention in which an individual substantially transversely extending leaf spring 31 is provided for each front wheel of the vehicle. In this form of my invention the cantilever type spring is not used. The end of each spring is fixed in a suitable manner at 32 directly to the opposite side of the frame 9 to that on which the wheel it supports is located. The same principle of my invention is employed in this form, however, that is the individual springing of each wheel by a transverse spring of greater length than the distance between the center line of the automotive vehicle and the wheel. In this form of my invention each spring would be disposed in a modified transverse position, a slight relative angle being required to permit crossing of the springs.

It is to be further noted that in the system of my invention the transverse spring may be utilized as one of the wheel mounting arms and only one other pair of arms, such as 14, are required to mount the wheels for independent movement. I contemplate the use of other arrangements of mounting members in conjunction with the transverse spring system of my invention.

I contemplate the use of dual springs for trucks and where otherwise desired. The size of springs and location of mounting point on frame may be varied to meet any requirements of design and manufacture.

I claim:

1. In combination, a vehicle frame, a pair of vehicle wheels, a pair of independent transversely extending cantilever springs, one end of each of said springs being associated with one of said vehicle wheels, a pair of bracket members each fixed to opposite sides of said vehicle frame and extending outwardly therefrom, the other end of each of said springs being shackled to the outer ends of said bracket members, a saddle member mounted on each of said springs intermediate the ends of each spring, each of said saddle members being pivotally mounted on the opposite side of the center line of said vehicle frame to that on which the wheel said spring supports is located.

2. In combination, a vehicle frame, a pair of vehicle wheels, a spindle member for each of said wheels, a pair of radius rods, the inner ends of said rods being pivotally connected with a portion of the vehicle frame, the outer ends of said rods being pivotally connected with the spindle member of one of said wheels, a pair of separate transversely extending cantilever vehicle springs, the outer ends of said springs being pivotally associated with one of said spindle members, each of said springs being mounted on the frame by means of a fixed mounting on the end thereof and a pivotal mounting intermediate the ends of the spring, both said fixed and pivotal mountings being disposed on that side of the center line of the frame which is opposite to the side on which the wheel with which said spring is associated is located.

3. In combination, a vehicle frame, a right side rail in said frame, a left side rail in said frame, a right vehicle wheel, a left vehicle wheel, an individual transversely extending cantilever leaf spring pivotally associated with each wheel, the spring for the right wheel being fixed to the left side rail of the frame and the spring for the left wheel being fixed to the right side rail of the frame, each of said springs having an additional pivotal association with said frame intermediate the ends of each spring, the pivotal mounting for the right wheel spring being associated with the left side of the center line of the vehicle frame and the pivotal mounting for the left wheel spring being associated with the right side of the center line of said frame.

GEORGE WOLFF.